Nov. 10, 1970     K. ANDERSON     3,538,632
LENTICULAR DEVICE AND METHOD FOR PROVIDING SAME
Filed June 8, 1967

INVENTOR.
KAY ANDERSON
BY
MARCH, LeFEVER & WYATT
ATTORNEYS

United States Patent Office 3,538,632
Patented Nov. 10, 1970

3,538,632
LENTICULAR DEVICE AND METHOD FOR
PROVIDING SAME
Kay Anderson, New Rochelle, N.Y., assignor to Pictorial
Productions, Inc., Mount Vernon, N.Y., a corporation
of New York
Filed June 8, 1967, Ser. No. 644,566
Int. Cl. G09f 19/00
U.S. Cl. 40—106.51                                  7 Claims

ABSTRACT OF THE DISCLOSURE

A lenticular device having a lens sheet of transparent material with a plurality of parallel lenticular ridges forming lens elements on the upper surface of the sheet. In addition, the device has a carrier sheet positioned under the lens sheet with an upper surface adapted for face to face contact with the undersurface of the lens sheet. The upper surface of the carrier sheet has a plurality of pictures of a subject resolved graphically into a series of segments in the form of parallel complementary lineations spaced in optical registry for viewing through the lens sheet. Advantageously, the carrier sheet has indicia thereon for coloring various parts of the picture with transparent colored material in accordance with a predetermined color scheme to enhance the effect of the lenticular device.

---

The present invention relates to a lenticular device and more particularly to a lenticular device for providing a colored animated or three-dimensional picture display and a method of making same.

Paint by number games and similar devices have become quite popular. However, these devices provide only two-dimensional paintings or pictures when completed and do not provide a method for providing an animated or three dimensional effect for the complete painting.

An object of the present invention is to provide a lenticular device that may be colored with a transparent material in accordance with a predetermined color code.

It is another object of this invention to provide such a lenticular device that is colored in a manner to enhance the animated or three-dimensional effect thereof.

A further object of this invention is to provide a method of making such a lenticular device.

Other objects and advantages will be readily apparent from the following detailed specification and the attached drawing wherein.

It has now been found that the foregoing objects and other advantages can be readily attained in a lenticular device having a lens sheet of transparent material with a plurality of parallel lenticular ridges forming lens elements on the upper surface of the sheet. A carrier sheet for positioning under the lens sheet is provided with an upper surface adapted for face to face contact with the undersurface of the lens sheet. The upper surface of the carrier sheet has a plurality of pictures of a subject resolved graphically into a series of segments in the form of parallel complementary lineations spaced in optical registry with the ridges for viewing through the lens sheet. Advantageously, the carrier sheet has indicia thereon for coloring various parts of the lineiform picture with transparent colored material in accordance with a predetermined color scheme to enhance the effect of the lenticular device.

Desirably, the indicia is removable so that it may be taken off the carrier sheet before the transparent material is applied.

The lineiform picture may be images of a subject from different positions so that movement of the head of the viewer relative to the lenticular device or movement of the lens sheet relative to the carrier sheet causes apparent movement of the subject of the viewer. The indicia may be adapted for a color scheme of transparent paint to enhance the apparent movement of the subject to the viewer.

In addition, the lenticular device may have a lineiform picture composed of a plurality of images of a subject taken from several different points of view so that the subject has the appearance of depth to the viewer. Similarly, the indicia may be adapted for a color scheme of transparent paint to enhance the appearance of depth to the viewer.

The transparent color material desirably is of transparent paint of different colors and shades applied to the carrier sheet in accordance with indicia in the form of a paint by number color scheme.

In addition, this invention provides for a method of making a colored lenticular device by providing a carrier sheet having an upper surface with a plurality of the pictures thereon resolved graphically into a series of segments in the form of parallel complementary lineations. The next step is to paint the lineiform pictures on the carrier sheet with transparent paint in accordance with a predetermined color scheme indicated by indicia on the picture, and then finally by providing a lens sheet of transparent material in face to face contact with the carrier sheet. The lens sheet has a plurality of parallel lenticular ridges forming lens elements adapted to complement the lineation of the carrier sheet.

Figure 1:
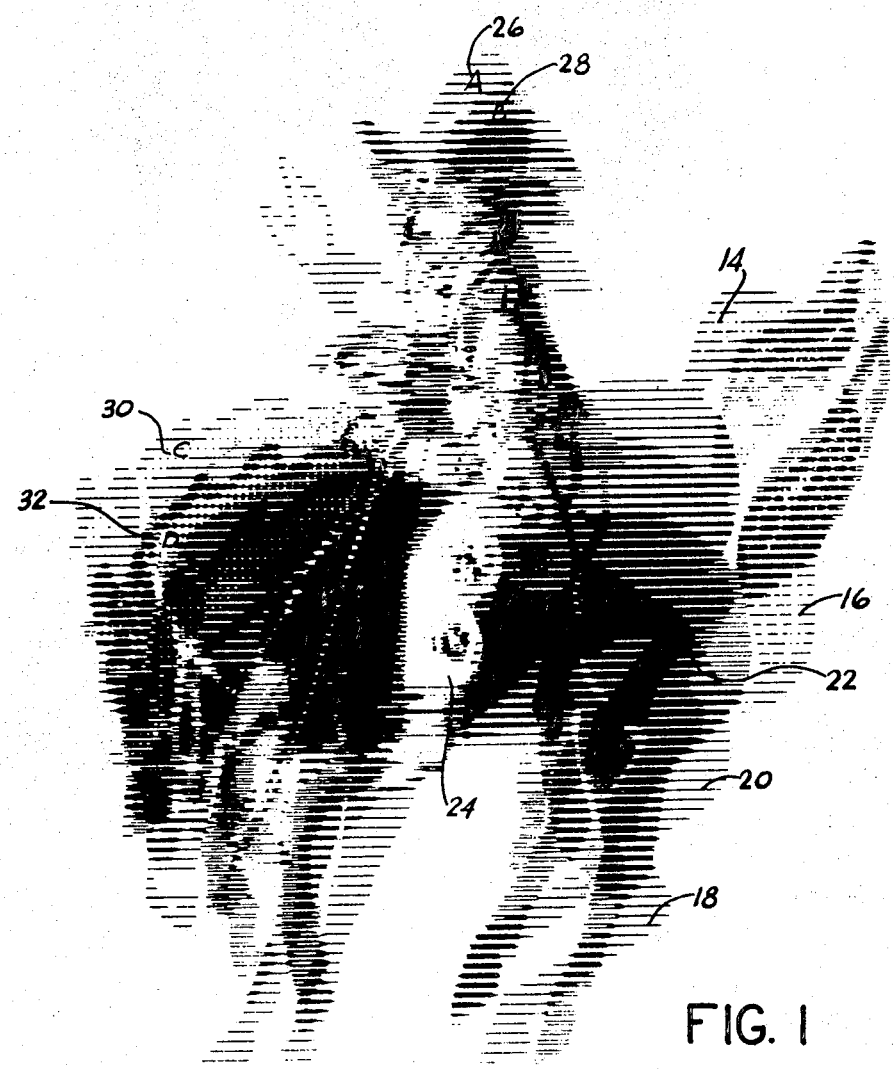
FIG. 1 is a lineiform picture of a cowboy on a horse resolved graphically from a plurality of images into a series of picture segments in the form of parallel fine complemental lineations.

Referring now to the drawing, there is illustrated in FIG. 1 a lineiform picture of a cowboy riding a bucking horse constituting a group production of a photograph painting or the like resolved graphically into a series of picture segments in the form of parallel fine complemental lineations. The lineations represent pictures of different poses of the cowboy and bucking horse so that when the figure is viewed on a lenticular screen, illustrated in FIG. 2, it produces an illusion of motion or animation when the position of the screen is changed relative to the line of vision or the screen is moved relative to the lineiform picture.

The lineiform picture of FIG. 1 may also be images of a subject from separate points of view so that the different images of the lineated picture, when viewed through a lenticular screen, are fused into a single image imparting the impression of depth. As the observer moves relative to the lenticular viewing screen, the images of the subject from different points of view come successively into view thereby creating an enhanced impression of depth.

Accordingly, this invention may be used to display animated pictures of images of the same subject in different poses, and also for display of three-dimensional pictures where two or more images of the same subject are taken from different points of view and are blended by sensory perception into a single three-dimensional picture. The manner in which these effects are produced and the optics of the phenomena described are well known as may be seen from the disclosure of U.S. Pat. No. 2,815,310 to Victor G. Anderson.

This invention advantageously provides for painting various portions of the lineiform picture of FIG. 1 with transparent paint of different colors and shades to enhance the animation or free-dimentional effect of the lenticular device. Thus the area designated by the numeral 14 may be painted with one shade of a color and the area designated by the numeral 16 can be painted with a different shade of the same color to increase the appearance of movement or depth of the tail of the horse. The area desingated by the numeral 18 may be painted with a different color than the area 14 and the area 20 may be colored with a different shade than the area 18 to enhance the appearance of movement or depth of the legs of the horse. The area designated by the numeral 22, a portion without lineations, may be painted with one color to indicate the color of the horse's body while the area designated by the numeral 24 can be painted a different color to indicate the color of the pants of the rider. Similarly, the remaining portions of the horse and rider can be painted with various colors and shades thereof in order to enhance the appearance of movement or depth to the viewers.

As illustrated in FIG. 1, indicia may be provided on the lineiform picture to indicate the color or shade of paint to be applied to a particular area. For instance, a color code may be provided to paint the area A, designated by the numeral 26, a certain shade of green and the area B, designated by the numeral 28, a deeper shade of green to enhance the appearance of animation or depth of the hat of the rider. The area of the horse's neck C, designated by the numeral 30, may be color coded to be painted a certain shade of brown and the area of the horse's neck D, designated by then umeral 32, can be painted a deeper shade of brown to enhance the appearance of movement or three-dimensional of this area of the lineiform picture. Similarly, the remaining portions of the picture may be color coded with indicia to indicate the color or shades of color to be applied by means of transparent paint. Desirably, the indicia such as A, B and C is readily removable before painting so that these marks do not show through after these areas have been painted with transparent paint.

Figure 2:
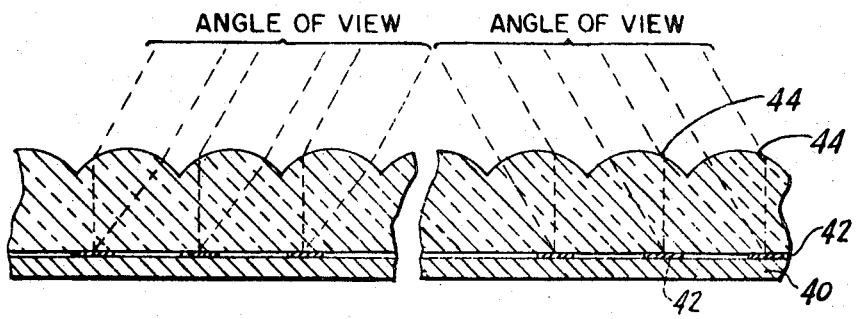
FIG. 2 is a cross sectional view of the lenticular device of this invention with the lineiform picture of FIG. 1 illustrating different angles of view.

As illustrated in FIG. 2 the lineiform picture of FIG. 1 may be printed or otherwise applied to a carrier sheet 40 having lineations 42 corresponding to the lineations of the lineiform picture illustrated in FIG. 1. The lenticular lens is made of suitable transparent sheet material such as clear synthetic plastic and is provided with a surface formed with a plurality of parallel semicylindrical lenticular ridges 44 which serve as lens elements. The lenticular lens may be in any desired shape such as rectangular and the carrier sheet 40 is disposed below the lenticular lens so that these two members are in face to face relationship. The lineiform picture of FIG. 1 is resolved graphically on the carrier sheet 40 into segments in the form of parallel complementary lineations 42 for viewing through the lenticular lens as illustrated in FIG. 2. These lineations 42 are related so that when viewed successively by movement of the head of the viewer or by movement of the lenticular lens 12 with respect to the carrier sheet 40, the lineations 42 convey the image of a bucking horse with a rider. Lineations 42 may also represent images of an object from different points of view so that the different images, viewed through the lenticular screen, impart the impression of depth. The lenticular lens 12 and lineations 42 are formed so that the ridges 44 extend in a parallel direction and are in optical registry with the lineations 42.

Accordingly, by painting the lineiform picture of FIG. 1 with transparent paint of colors and shades of colors indicated by the indicia on the picture, a highly desirable and novel effect is created that enhances the animated effect of the picture or increases the appearance of the depth when viewed through the lenticular lens.

It will be understood that the foregoing description with the details of exemplarly structure is not to be construed in any way to limit the invention, but that modification may be made thereto without departing from the scope of the invention as set forth in the following claims.

Having thus described my invention, I claim:

1. A lenticular device comprising: a lens sheet of transparent material having a plurality of parallel lenticular ridges forming lens elements on the upper surface of said sheet; a carrier sheet for positioning under said lens sheet, said carrier sheet having an upper surface adapted for face to face contact with the under surface of said lens sheet; said upper surface of said carrier sheet having a plurality of pictures of a subject resolved graphically into a series of segments in the form of parallel complementary lineations spaced in optical registry with said ridges for viewing through said lens sheet; said carrier sheet having indicia thereon for coloring various parts of the picture with transparent colored material in accordance with a predetermined coloring scheme, those parts of the picture which are to be painted with the same or similar colors to be painted different shades of the chosen color to enhance the illusion of movement and depth to the viewer when viewed through said lens sheet.

2. The lenticular device of claim 1 wherein said indicia is removable so that said indicia may be taken off said carrier sheet before said transparent material is applied.

3. The lenticular device of claim 1 wherein said plurality of pictures are of a subject in different positions so that movement of the head of the viewer relative to said lenticular device and movement of the lens sheet relative to the carrier sheet causes apparent movement of the image of said subject to the viewer; and wherein said indicia is adapted for a color scheme of transparent paint to enhance the apparent movement of the image of said subject to the viewer.

4. The lenticular device of claim 1 wherein said plurality of pictures are of a subject from separate points of view so that said subject has the appearance of depth to the viewer; and wherein said indicia is adapted for a color scheme of transparent paint to enhance the appearance of depth to the viewer.

5. The lenticular device of claim 3 wherein said transparent colored material is transparent paint of different colors and shades applied to said carrier sheet in accordance with said indicia in the form of a paint by number color scheme.

6. The lenticular device of claim 4 wherein said transparent colored material is transparent paint of different colors and shades applied to said carrier sheet in accordance with said indicia in the form of paint by number color scheme.

7. A lenticular device comprising: a lens sheet of transparent material having a plurality of parallel lenticular ridges forming lens elements on the upper surface of said sheet; a carrier sheet for positioning under said lens sheet, said carrier sheet having an upper surface adapted for face to face contact with the undersurface of said lens sheet; said upper surface of said carrier sheet having a plurality of pictures of a subject resolved graphically into a series of segments in the form of parallel complementary lineations spaced in optical registry with said ridges for viewing through said lens sheet and transparent paint applied to said carrier sheet in accordance with a predetermined color scheme to enhance the effect of said lenticular device, those parts of the picture which are to be painted with the same or similar colors to be painted different shades of the chosen color to enhance the illusion of movement and depth to the viewer when viewed through said lens sheet.

References Cited

UNITED STATES PATENTS

| | | | |
|---|---|---|---|
| 1,475,430 | 11/1923 | Curwen | 40—137 |
| 2,799,938 | 7/1957 | Anderson. | |
| 2,832,593 | 4/1958 | Anderson | 40—137 X |
| 2,954,615 | 10/1960 | Brown | 35—26 |

EUGENE R. CAPOZIO, Primary Examiner

R. CARTER, Assistant Examiner

U.S. Cl. X.R.

40—137